United States Patent [19]

Mayo

[11] Patent Number: 4,947,883
[45] Date of Patent: Aug. 14, 1990

[54] INFANT SUN SHADE APPARATUS

[76] Inventor: Kay L. Mayo, 3625 N. 350 East, Huntington, Ind. 46750

[21] Appl. No.: 330,210

[22] Filed: Mar. 29, 1989

[51] Int. Cl.$^5$ .......................................... E04H 15/04
[52] U.S. Cl. .................................... 135/90; 160/370.2; 280/749; 296/97.7
[58] Field of Search ............... 135/90; 160/370.2, 237, 160/252; 280/748, 749, 751; 296/97.1, 97.7

[56] References Cited

U.S. PATENT DOCUMENTS

| | | | |
|---|---|---|---|
| 1,841,002 | 1/1932 | Bell | 135/90 |
| 2,025,822 | 12/1935 | Pryor | 280/749 |
| 2,261,141 | 11/1941 | Davis | 160/352 |
| 2,266,854 | 12/1941 | Davis | 160/352 |
| 2,827,305 | 3/1958 | Graham | 280/751 |
| 2,855,241 | 10/1958 | Walter | 60/370.2 |
| 2,911,038 | 11/1959 | Frommelt | 160/352 |
| 4,784,426 | 11/1988 | Iches | 160/370.2 |

*Primary Examiner*—Henry E. Raduazo
*Attorney, Agent, or Firm*—Leon Gilden

[57] ABSTRACT

An infant sun shade apparatus is formed with a malleable memory retentent elongate channel formed with a planar upper and lower surface. The upper surface of the channel includes a series of hook and loop fasteners securable to a head liner surface of an associated automobile. A plurality of vertically oriented transparent shades utilizing photochromic material to accommodate various intensity of sunlight are formed with axles extending upwardly and parallel to the shades and extending through the channel to accommodate deformation of the channel. Each lowermost edge of the channel is formed with a continuous conduit receiving a single continuous rope-like member therethrough to impose structural and geometric integrity to the shades. The rope-like member is formed with a loop at each end thereof for securement of a clip and tether line thereto for maintaining a desired orientation of the apparatus relative to an infant.

10 Claims, 1 Drawing Sheet

U.S. Patent  Aug. 14, 1990  4,947,883
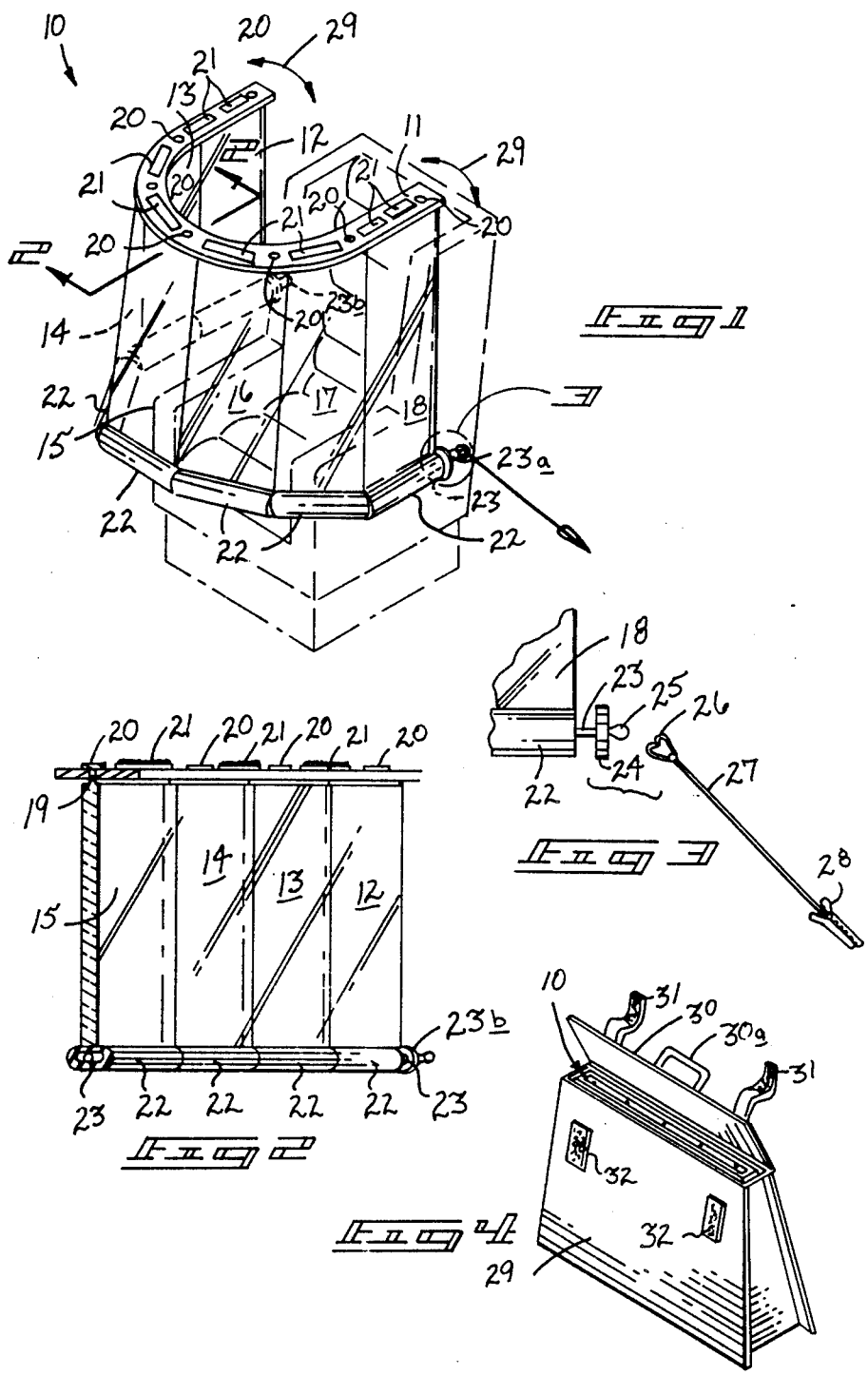

INFANT SUN SHADE APPARATUS

BACKGROUND OF THE INVENTION

1. Field of the Invention

The field of invention relates to sun shades, and more particularly pertains to a new and improved infant sun shade which may be manually manipulated to accommodated various geometric configurations to protect an infant from excessive exposure to sunlight.

2. Description of the Prior Art

The use of sun shades is well known in the prior art. The use of sun shades for protection of infants is of particular significance in that the infant's optical abilities are sensitive to intensity of sunlight exposure. Sun shade apparatus of the prior art has accommodated shades of particular configurations for particular applications. For example, U.S. Pat. No. 4,353,593 to Henson sets forth a sun visor capable of being color coordinated and completely withdrawn from view and is of interest relative to the particular application of a sun shade apparatus in a particular use therefore, but is of a structure relatively remote from that of the instant invention.

U.S. Pat. No. 4,497,515 to Appelson sets forth a pliable sheet of one-way viewing material wound on an overlying spring roller and secured in an extended position by electro-magnetic means. The Appelson patent is of a rather complex organization as opposed to that of the instant invention.

U.S. Pat. No. 4,560,245 to Sarber sets forth a heat transfer inhibiting curtain selectively mountable to an interior surface of an automotive windshield to reduce interior heat buildup in the vehicle when it is not being operated. The curtain amounts to a positionable rigid member positioned adjacent the interior of an automotive windshield.

U.S. Pat. No. 4,647,102 to Ebrahimzadeh sets forth an accordion-like curtain which may be extended forwardly of a vehicle windshield to protect the interior of the windshield with suction cups and the like for securement of the apparatus thereto.

U.S. Pat. No. 4,736,980 to Eubanks sets forth a further example of a vehicular windshield shade utilizing suction cup devices for securement of the shade to the windshield.

The prior art is of interest to note the use of various shades and their application within the interior of an automotive environment, but the prior art has heretofore failed to set forth an infant sun shade apparatus wherein the same addresses both the problems of ease of use and securement to an automotive head liners and convenient storage when not in use. To this extent, the present invention substantially fulfills this need.

SUMMARY OF THE INVENTION

In view of the foregoing disadvantages inherent in the known types of sun shade apparatus now present in the prior art, the present invention provides an infant sun shade apparatus wherein the same may be compactly stored when not in use, and may be further easily and effectively secured to an automotive interior during periods of use. As such, the general purpose of the present invention, which will be described subsequently in greater detail, is to provide a new and improved infant sun shade which has all the advantages of the prior art sun shade devices and none of the disadvantages.

To attain this, the present invention comprises an elongate plate-like channel including vertical pivotally mounted transparent sun shades with coextensive elongate conduits at the lowermost edges receiving an elongate continuous rope-like member to enable the rope-like member to be secured to desired portions of the interior to anchor the rope-like member thereto. Alligator-type clips secured to a tether line, which is in turn secured to the terminal ends of the rope-like member, are utilized to anchor the rope-like member. Hook and loop fastener strips are secured to an upper surface of the channel for securement of the channel to an associated head liner of an automobile. The channel is formed of malleable memory retentent polymeric or metallic material for maintaining a selected geometric configuration imparted to the channel.

My invention resides not in any one of these features per se, but rather in the particular combination of all of them herein disclosed and claimed and i& is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved infant sun shade apparatus which has all the advantages of the prior art sun shade devices and none of the disadvantages.

It is another object of the present invention to provide a new and improved infant sun shade apparatus which may be easily and efficiently manufactured and marketed.

It is a further object of the present invention to provide a new and improved infant sun shade apparatus which is of a durable and reliable construction.

An even further object of the present invention is to provide a new and improved infant sun shade apparatus which is susceptible of a low cost of manufacture with regard to both materials and labor, and which accordingly is then susceptible of low prices of sale to the consuming public, thereby making such infant sun shade apparatus economically available to the buying public.

Still yet another object of the present invention is to provide a new and improved infant sun shade apparatus which provides in the apparatuses and methods of the prior art some of the advantages thereof, while simultaneously overcoming some of the disadvantages normally associated therewith.

Still another object of the present invention is to provide a new and improved infant sun shade apparatus wherein the same may be manually deformed to a desired geometric configuration to provide adequate sun shading to an infant within the interior of an automobile.

Another object of the present invention is to provide a new and improved infant sun shade apparatus wherein the same utilizes sun shades formed of photochromic material to accommodate various intensities imparted to the sun shades.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention secured about an infant seat within an automotive interior.

FIG. 2 is an orthographic view taken along the lines 2—2 of FIG. 1 in the direction indicated by the arrows.

FIG. 3 is an orthographic view of the section 3 set forth in FIG. 1.

FIG. 4 is an isometric illustration of the carrying pouch for storage and transport of the instant invention.

DESCRIPTION OF THE PREFERRED EMBODIMENT

With reference now to the drawings, and in particular to FIGS. 1 to 4 thereof, a new and improved infant sun shade apparatus embodying the principles and concepts of the present invention and generally designated by the reference numeral 10 will be described.

More specifically, it will be noted that the infant sun shade apparatus 10 essentially comprises a plate-like channel formed of a malleable memory retentent material. Either a polymeric resin or a malleable metallic organization may be utilized and is formed with upper and lower planar surfaces. Pivotally mounted orthogonally through the upper and lower surfaces are a series of vertically oriented shades, including a first transparent 12, a second transparent shade 13, a third transparent shade 14, a fourth transparent shade 15, a fifth transparent shade 16, a sixth transparent shade 17, and a seventh transparent shade 18 of a predetermined width to completely border the lower surface of the channel 11. Each of the shades 12 through 18 includes an axle 19 extending orthogonally through an upper edge of each shade and pivotally mounted through the plate-like channel member 11 to be merged through the upper surface with an enlarged head 20, as illustrated in FIG. 2, to enable the relatively rigid shades to accommodate the malleable deformation of the channel 11. Positioned between each of the enlarged heads 20 on the upper surface of the channel 11 is a hook and loop fastener strip 21 comprising six strips spaced between each of the heads 20 of the seven shades to enable securement of the upper surface of the channel 11 to a typical fabric head liner, as utilized in an automobile.

Formed coextensively with each lowermost edge of each shade 12 through 18 is a hollow conduit 22 with an elongate continuous flexible rope 23 extending therethrough and emerging through the respective conduits 22 of the first and seventh shades 12 and 18 respectively. The flexible rope includes an abutment plate formed exteriorly of the conduit to prevent withdrawal of the rope interiorly of the respective conduits and includes a loop 25 formed on each terminal end of the rope 23. The rope 23 enables alignment of the shades 11 upon flexure of the channel 11 into a predetermined geometric configuration.

As illustrated in FIG. 3, a spring clip 26 is securable through each loop 25 of the rope 23 and includes an associated flexible tether line which itself terminates in an alligator-type spring clip 28. The alligator spring clip is formed with typical serrated teeth to enable securement of the tether line to various portions of the automotive interior to align the sun shade apparatus 10 in a predetermined orientation relative to an infant car seat, as illustrated in FIG. 1 for example.

FIG. 4 is illustrative of a flexible storage pouch 29 utilized to store and transport the infant sun shade apparatus 10 when not in use. The pouch includes a cover flap 30 and a medially oriented handle 30a. Spaced hook and loop fastener clips 31 are formed and extend from the upper surface of the cover flap 30 and are securable to spaced hook and loop fastener patches 32 formed on a forward face of the pouch 29. The pouch 29 defines an interior length, width, and height to accommodate the dimensions of the infant sun shade apparatus 10.

Further, it should be understood that the sunshades 12 through 18 are formed of a photochromic material to enable the sun shades to accommodate and darken in response to increased intensity of sunlight imposed upon them.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An infant sun shade apparatus comprising, a flexible and malleable channel of a finite length including an upper surface spaced above an underlying lower surface, and a plurality of transparent sun shades of a predetermined width depending downwardly form the channel, and a flexible rope member extending through individual securement members formed to the lowermost edges of the individual sun shade and extending beyond the sun shades for alignment of the lowermost edges of the sun shades wherein the rope is defined by terminal ends extending beyond the sun shades.

2. An infant sun shade apparatus as set forth in claim 1 wherein each of the terminal ends of the rope includes an abutment member and a loop extending beyond the abutment member, and further including a tether line securable to each of the loops for anchoring of the rope.

3. An infant sun shade apparatus as set forth in claim 2 wherein the tether line includes a spring clip at one end thereof and an alligator clip formed with serrated teeth at the end thereof.

4. An infant sun shade apparatus as set forth in claim 3 wherein the sum total of the individual widths of the individual sun shades equals the finite length of the channel.

5. An infant sun shade apparatus as set forth in claim 4 wherein each of the sun shades includes an axle integrally formed to an upper edge of each of the sun shades and pivotally extending through the upper and lower surfaces of the channel, the axles terminate in an enlarged head extending beyond the axle on the upper surface of the channel.

6. An infant sun shade apparatus as set forth in claim 5 wherein a hook and loop fastener strip is positioned and integrally secured to the upper surface of the channel between each of the enlarged heads of each of the axles.

7. An infant sun shade apparatus as set forth in claim 6 wherein the securement members formed to the lowermost edges of the sun shades are formed as through-extending conduits to slidingly receive the rope therethrough.

8. An infant sun shade apparatus as set forth in claim 7 wherein the transparent sun shades are formed of photochromic material.

9. An infant sun shade apparatus as set forth in claim 8 wherein the channel is formed of a memory retentent material to maintain a predetermined geometric configuration imparted to the channel upon manual deformation of the channel.

10. An infant sun shade apparatus as set forth in claim 9 further including a storage pouch defined with a compartment to receive the channel, sun shades, and conduits therewithin, the pouch including a flexible lid with first and second hook and loop fastener clips formed thereto securable to companion hook and loop fastener patches formed on a forward face of the pouch.

* * * * *